US012080028B2

(12) United States Patent
Chang et al.

(10) Patent No.: US 12,080,028 B2
(45) Date of Patent: Sep. 3, 2024

(54) LARGE POSE FACIAL RECOGNITION BASED ON 3D FACIAL MODEL

(71) Applicant: Intuit Inc., Mountain View, CA (US)

(72) Inventors: Jianxiang Chang, Mountain View, CA (US); Lin Tao, Campbell, CA (US)

(73) Assignee: Intuit Inc., Mountain View, CA (US)

( * ) Notice: Subject to any disclaimer, the term of this patent is extended or adjusted under 35 U.S.C. 154(b) by 414 days.

(21) Appl. No.: 17/490,791

(22) Filed: Sep. 30, 2021

(65) Prior Publication Data

US 2023/0102682 A1 Mar. 30, 2023

(51) Int. Cl.
G06T 7/73 (2017.01)
G06F 3/01 (2006.01)
G06F 21/32 (2013.01)
G06N 20/00 (2019.01)
G06V 40/16 (2022.01)

(52) U.S. Cl.
CPC ............... G06T 7/75 (2017.01); G06F 3/017 (2013.01); G06F 21/32 (2013.01); G06N 20/00 (2019.01); G06V 40/172 (2022.01)

(58) Field of Classification Search
CPC ......... G06T 7/75; G06N 20/00; G06V 40/172
See application file for complete search history.

(56) References Cited

U.S. PATENT DOCUMENTS

| 2010/0045680 A1* | 2/2010 | Havaldar ............... G06T 13/40 |
| | | 345/473 |
| 2021/0056291 A1* | 2/2021 | Doublet ................ G06V 40/18 |
| 2021/0150186 A1* | 5/2021 | Lehman ............... G06V 40/171 |
| 2021/0240808 A1* | 8/2021 | Deore .................... G06V 40/45 |
| 2022/0101655 A1* | 3/2022 | Chan ..................... A61B 5/165 |

OTHER PUBLICATIONS

H. H. S. Ip and Li-Jun Yin, "Arbitrary facial views generation from two orthogonal facial images," 1995 IEEE International Conference on Systems, Man and Cybernetics. Intelligent Systems for the 21st Century, Vancouver, BC, Canada, 1995, pp. 1079-1084 vol.2, doi: 10.1109/ICSMC.1995.537913. (Year: 1995).*

(Continued)

Primary Examiner — Bobbak Safaipour
Assistant Examiner — Ashley L. Hytrek
(74) Attorney, Agent, or Firm — Lathrop GPM LLP

(57) ABSTRACT

A method including generating a captured facial object and a captured pose from a captured image. The method also includes obtaining a base facial object and a base pose from a base image. The method also includes generating base pose angles using the captured pose, and captured pose angles using the captured pose. The method also includes obtaining selected base images using the base pose angles and the base facial object. The method also includes generating selected captured images using the captured pose angles and the captured facial object. The method also includes comparing the selected base images to the selected captured images to establish a comparison. The method also includes outputting a match output using the comparison.

20 Claims, 9 Drawing Sheets

(56) References Cited

OTHER PUBLICATIONS

L. Best-Rowden, H. Han, C. Otto, B. F. Klare and A. K. Jain, "Unconstrained Face Recognition: Identifying a Person of Interest From a Media Collection," in IEEE Transactions on Information Forensics and Security, vol. 9, No. 12, pp. 2144-2157, Dec. 2014, doi: 10.1109/TIFS.2014.2359577. (Year: 2014).*

Marriott, R. T., et al., "A 3D Gan for Improved Large-Pose Facial Recognition", https://cvpr2021.thecvf.com/openaccess/menu, CVPR2021, Jun. 19-25, 2021, 2 pages.

Wang, G., et al., "Pseudo Facial Generation with Extreme Poses for Face Recognition", http://cvpr2021.thecvf.com/openaccess/menu, CVPR 2021, Jun. 19-25, 2021, 2 pages.

* cited by examiner

LARGE POSE FACIAL RECOGNITION BASED ON 3D FACIAL MODEL

BACKGROUND

Computerized facial recognition technology encounters difficulties when comparing facial images having large pose angles with facial images having small pose angles. A pose angle is the angle of the face relative to an imaginary axis defined with respect to the display screen. For example, an image of a face staring directly at the display screen is considered a "small" pose (e.g., an angle of 0, 0, 0 (pitch, yaw, and roll) with respect to an three-dimensional axis defined with respect to the display screen). An image of a face whose head is turned perpendicularly to one side (e.g., an angle of 90, 0, 0 with respect to pitch, yaw, and roll for the same axis) is considered a "large" pose. In other words, when a person's facial image shows the profile (i.e., side view) of the face, a large pose is shown on the screen; however, when a person's facial image directly faces the screen (i.e., a front view), a small pose is shown.

The definition of "large pose" and "small pose" may vary depending on engineering tolerances for a particular application. For example, a pose may be considered a "large" pose when the angle of the profile is (45, 0, 0) or (10, 10, 10). In general a "small" pose is any pose which has a range of pose angles that is pre-defined to be "small." In general, a "large" pose is any pose for which a computer encounters computational difficulties when comparing a first face with a first pose to a second face with a larger pose.

SUMMARY

The one or more embodiments provide for a method. The method includes generating a captured facial object and a captured pose from a captured image. The method also includes obtaining a base facial object and a base pose from a base image. The method also includes generating base pose angles using the captured pose, and captured pose angles using the captured pose. The method also includes obtaining selected base images using the base pose angles and the base facial object. The method also includes generating selected captured images using the captured pose angles and the captured facial object. The method also includes comparing the selected base images to the selected captured images to establish a comparison. The method also includes outputting a match output using the comparison.

The one or more embodiments also provide for a system. The system includes a processor and a data repository in communication with the processor and storing a base image and a captured image. The data repository also stores a captured facial object and a base facial object. The data repository also stores a base pose and a captured pose. The data repository also stores base pose angles and captured pose angles. The data repository also stores selected base images and selected captured images. The data repository also stores match values, a match threshold, and a match output. The system also includes a model system executable by the processor and including a facial object model, an object pose model, and a match model. The system also includes a server application which, when executed by the processor, is configured to apply the base image to the facial object model to generate the base facial object. The server application is also configured to apply the captured image to the facial object model to generate the captured facial object. The server application is also configured to generate the base pose angles based on the captured pose and the captured pose angles based on the captured pose. The server application is also configured to generate the selected base images using the base facial object and the base pose angles. The server application is also configured to generate the selected captured images based on the captured facial object and the captured pose angles. The server application is also configured to apply the selected base images and the selected captured images to the match model to generate the match values. The server application is also configured to generate a match output from a combination of the match values and the match threshold.

The one or more embodiments provide for another method. The method includes generating a captured facial object and a captured pose from a captured image of a user. The method also includes obtaining a base facial object and a base pose from a base image of the user. The method also includes generating base pose angles using the captured pose, and captured pose angles using the captured pose. The method also includes obtaining selected base images using the base pose angles and the base facial object. The method also includes generating selected captured images using the captured pose angles and the captured facial object. The method also includes comparing the selected base images to the selected captured images to establish a comparison. The method also includes outputting a match output from the comparison. The method also includes identifying the user as an authentic user in response to the match output satisfying a match threshold.

Other aspects of the one or more embodiments will be apparent from the following description and the appended claims.

DETAILED DESCRIPTION

Figure 1A:
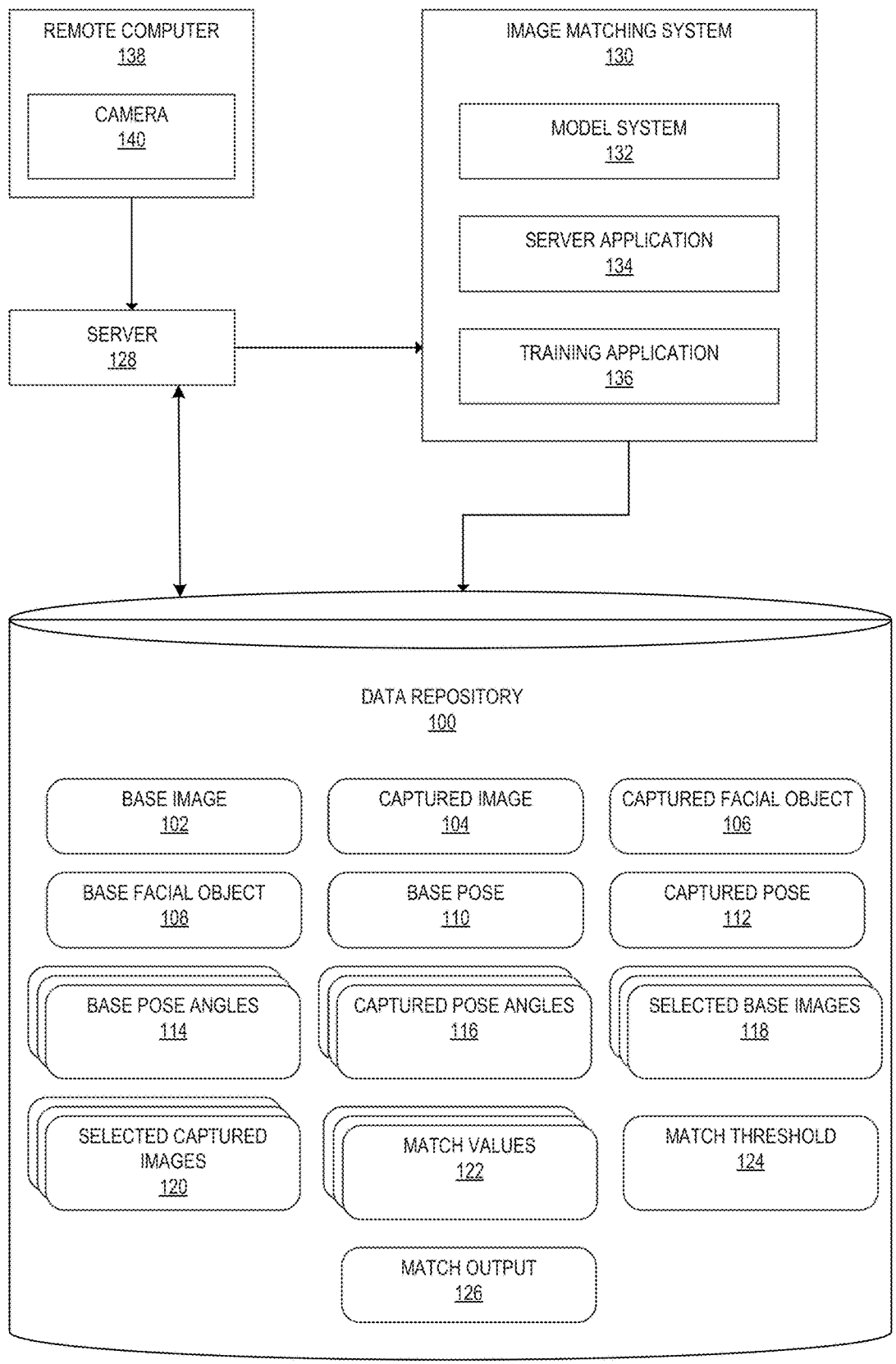
FIG. 1A and FIG. 1B show a computing system, in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a computer or a computer-executed instruction, refers to a computer engineering tolerance anticipated or determined by a computer scientist or computer technician of ordinary skill in the art. The exact quantified degree of an engineering tolerance depends on the software and/or hardware in use and the technical property being measured. For a non-limiting example, two processes may be "about" concurrent when one process is executed within a pre-defined number of processor operations of the other process. In another non-limiting example in which an algorithm compares a first property to a second property, the first property may be "about" equal to the second property when the two properties are within a pre-determined range of measurement. Engineering tolerances could be loosened in other embodiments; i.e., outside of the above-mentioned pre-determined range in one embodiment, but inside another pre-determined range in another embodiment. In any case, the ordinary artisan is capable of assessing what is an acceptable engineering tolerance for a particular algorithm, process, or hardware arrangement, and thus is capable of assessing how to determine the variance of measurement contemplated by the term "about."

As used herein, the term "connected to" contemplates multiple meanings. A connection may be direct or indirect. For example, computer A may be directly connected to computer B by means of a direct communication link. Computer A may be indirectly connected to computer B by means of a common network environment to which both computers are connected. A connection may be wired or wireless. A connection may be temporary, permanent, or semi-permanent communication channel between two entities.

As used herein, an entity is an electronic device, not necessarily limited to a computer. Thus, an entity may be a mobile phone, a smart watch, a laptop computer, a desktop computer, a server computer, etc. As used herein, the term "computer" is synonymous with the word "entity," unless stated otherwise.

In general, the one or more embodiments related to overcoming a technical challenge in computerized facial image recognition. In particular, it is difficult for a computer to compare a large pose facial image to a small pose facial image. Furthermore, because computerized transformation of a facial image (e.g., rotation) may degrade a captured image and/or be inaccurate, using a computer to compare a large pose facial image to a small pose facial image can be impracticable or impossible.

The one or more embodiments address the above technical challenge by using a combination of machine learning models to compare a known image with a small pose to multiple generated variations of a captured image at a large pose. For example, in an embodiment, a company has a photo ID of an employee. The photo ID has a small pose. A large pose of a person is captured with a computer camera, and the person in front of the camera is supposed to be the employee. The pose of the photo ID is a "base pose." The pose of the captured image is a "captured pose."

A base facial object of the base pose and a captured facial object of the captured pose are constructed. Angles are selected for each of the base facial object and the captured facial object. The angles are applied to the base facial object and the captured facial object to rotate the objects. As a result, a variety of base images and a variety of captured images are generated according to the procedures described more fully below. The varieties of the base images and the captured images are compared using an image matching machine learning model. If any two of the varieties of images match to within a threshold amount, then a match is found between the base image and the captured image.

Attention is now turned to the figures. FIG. 1A shows a computing system, in accordance with one or more embodiments. The computing system includes a data repository (100). In one or more embodiments, the data repository (100) is a storage unit and/or device (e.g., a file system, database, collection of tables, or any other storage mechanism) for storing data. Further, the data repository (100) may include multiple different storage units and/or devices. The multiple different storage units and/or devices may or may not be of the same type and may or may not be located at the same physical site.

The data repository (100) stores a base image (102). The base image (102) is a control image which has an associated identity that is already known. For example, the base image (102) may be a photo ID of an employee or some other known person. In an embodiment, the base image (102) has a small pose. However, in other embodiments, the base image (102) may have a large pose. Unless specified otherwise herein, it is assumed that the base image (102) has a small pose.

The data repository (100) also stores a captured image (104). The captured image (104) is a facial image captured by a camera. The captured image (104) may have a small pose or a large pose. Treatment of the captured image (104) is described with respect to FIG. 2A.

The data repository (100) also stores a captured facial object (108). The captured facial object (108) is a computer generated construct of the captured image (104). In an embodiment, the captured facial object (108) is a three-dimensional construct. Thus, for example, whereas the captured image (104) is a two-dimensional picture, the captured facial object (108) may be an estimated three-dimensional representation of the captured image (104). Unless otherwise stated, it is assumed that the captured facial object (108) is an estimated three-dimensional representation of a two-dimensional captured image (104).

The data repository (100) also stores a base facial object (108). The base facial object (108) is a computer generated construct of the base image (102). In an embodiment, the base facial object (108) is a three-dimensional construct. Thus, for example, whereas the base image (102) is a two-dimensional picture, the base facial object (108) may be an estimated three-dimensional representation of the base image (102). Unless otherwise stated, it is assumed that the base facial object (108) is an estimated three-dimensional representation of a two-dimensional base image (102).

The data repository (100) also stores a base pose (110). The base pose (110) is a pose of the base image (102), and hence also of the base facial object (108). In other words, the base pose (110) is the set of angles for one or more of pitch, yaw, and roll for either or both of the base image (102) or the base facial object (108). The angles are measured with respect to an imaginary set of axes defined with respect to a screen on which the base image (102) or the base facial object (108) may be displayed on a display device.

The data repository (100) also stores a captured pose (112). The captured pose (112) is a pose of the captured image (104), and hence also of the captured facial object (106). In other words, the captured pose (112) is the set of angles or one or more of pitch, yaw, and roll for either or both of the captured image (104) or the captured facial object (106). The angles are measured with respect to an imaginary set of axes defined with respect to a screen on which the captured image (104) or the captured facial object (106) may be displayed on a display device. The axes used with respect to the captured pose (112) are the same as the axes used with respect to the base pose (110).

The data repository (100) also stores base pose angles (114). The base pose angles (114) are a set of pose angles that will be used to alter the base facial object (108) to generate the selected base images (118). Generation and use of the base pose angles (114) is described with respect to FIG. 2A.

The data repository (100) also stores captured pose angles (116). The captured pose angles (116) are a set of pose angles that will be used to alter the pose of the captured facial object (106) to generate the selected captured images (120). Generation and use of the captured pose angles (116) is described with respect to FIG. 2A.

The number of the base pose angles (114) need not be the same as the number of the captured pose angles (116). For example, in one embodiment, there may be five base pose angles (114), but three captured pose angles (116). However, these numbers may vary and in some embodiments the number of the base pose angles (114) may match the number of the captured pose angles (116).

The data repository (100) also stores a number of selected base images (118). The selected base images (118) are each a representation of the base facial object (108), as modified by the base pose angles (114). For example, if five base pose angles (114) are selected, then there will be five selected base images (118): a first rotated by the first of the base pose angles (114), a second rotated by the second of the base pose angles (114), a third rotated by the third of the base pose angles (114), a fourth rotated by the fourth of the base pose angles (114), and a fifth rotated by the fifth of the base pose angles (114).

The data repository (100) also stores a number of selected captured images (120). The selected captured images (120) are each a representation of the captured facial object (106), as modified by the captured pose angles (116). For example, if three captured pose angles (116) are selected, then there will be three selected captured images (120): a first rotated by the first of the captured pose angles (116), a second rotated by the second of the captured pose angles (116), and a third rotated by the third of the captured pose angles (116).

The data repository (100) also stores one or more match values (122). A match value is a number that represents a probability that one of the selected base images (118) matches one of the selected captured images (120). Each of the match values (122) is generated using a machine learning model, as described with respect to FIG. 2A.

Figure 2A:
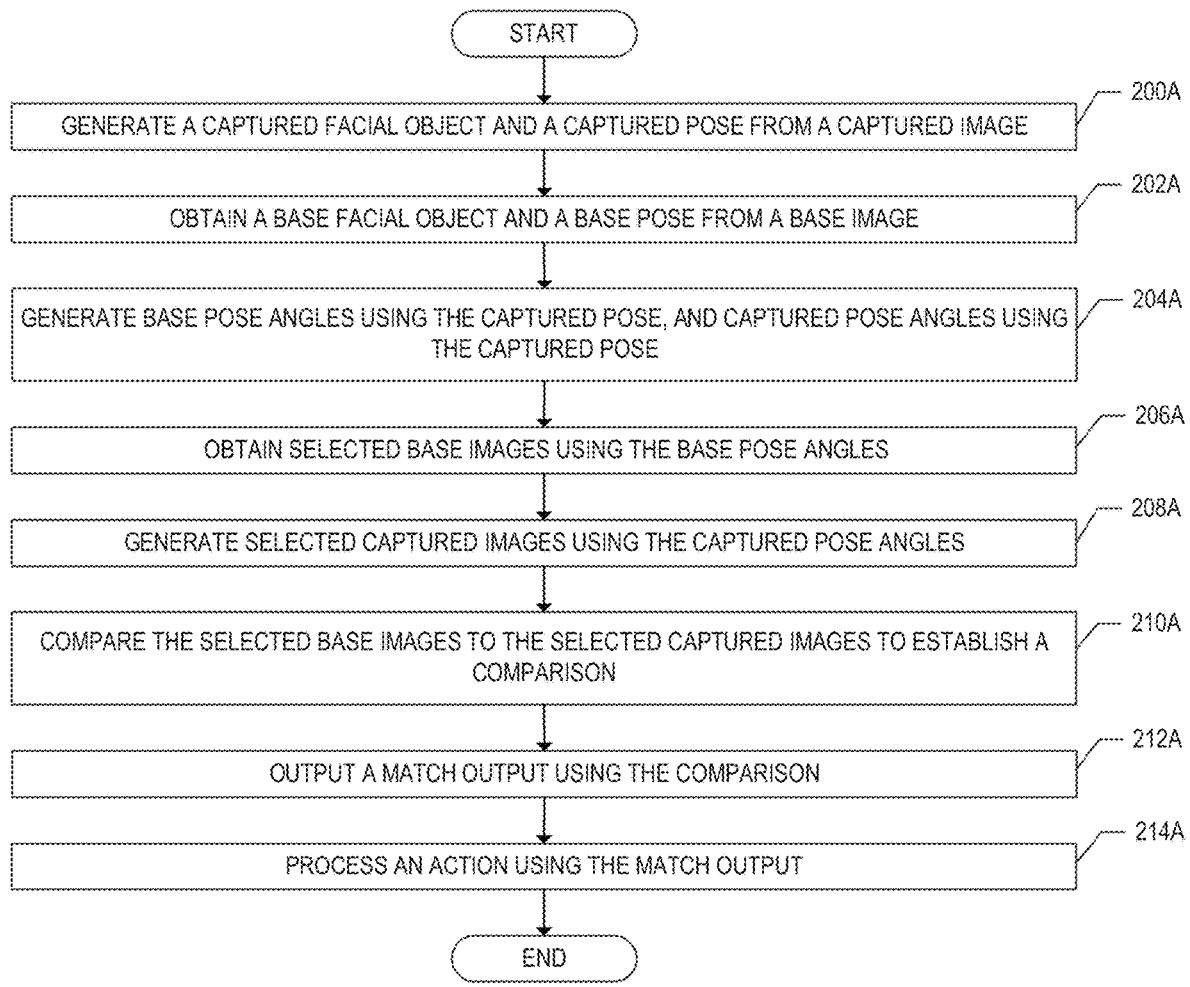
FIG. 2A and FIG. 2B show computer-implemented methods, in accordance with one or more embodiments.

The number of the match values (122) equals the number of comparisons performed between the selected base images (118) and the selected captured images (120), as described with respect to FIG. 2A. Continuing the example above, assume that there are five of the selected base images (118) and three of the selected captured images (120). Further assume that every one of the selected base images (118) is compared to every one of the selected captured images (120) (it is not necessarily the case that all of the selected base images (118) are compared to all of the selected captured images (120)). In this example, there will be three times five, or fifteen of the match values (122).

The data repository (100) also stores a match threshold (124). The match threshold (124) is a pre-defined number. The match threshold (124) represents a selected probability at or above which a match value from the match values (122) indicates a match between one of the selected base images (118) and another of the selected captured images (120). In other words, if a match value generated by comparing a selected base image to a selected captured image equals or is greater than the match threshold (124), then the selected base image is deemed to match the selected captured image. The value of the match threshold (124) is determined by a computer scientist in one embodiment, but may also be determined by a machine learning algorithm or some other automatic process.

The data repository (100) also stores a match output (126). The match output (126) is an indication of a match or a lack of a match between the selected base images (118) and the selected captured images (120). The match output (126) may be, for example, "no match," in which case none of the selected base images (118) or the selected captured images (120) have match values (122) that satisfies the match threshold (124). The match output (126) may be "match," such as for example when one of the selected base images (118) and one of the selected captured images (120) have a match value that satisfies the match threshold (124). In some embodiments, the match output (126) indicates a match when two or more of the selected base images (118) and selected captured images (120) have match values (122) that satisfies the match threshold (124).

In other embodiments, the match output (126) may be a result of a match or a failure to match. For example, the match output (126) may be a command to disallow a user to use software if none of the selected base images (118), when compared to the selected captured images (120), have match values (122) that satisfies the match threshold (124). Other variations are possible.

The system shown in FIG. 1 may include other components. For example, the system shown in FIG. 1 may include a server (128). The server (128) is one or more computers, in a possibly distributed environment, that are programmed to execute one or more applications to use or generate the information stored in the data repository (100). Thus, for example, the server (128) may execute the image matching system (130) described below. An example of the server (128) is described with respect to FIG. 7A and FIG. 7B.

The system shown in FIG. 1 may also include the image matching system (130). The image matching system (130) is one or more software applications that may be executed by the server (128) to generate the match output (126) described above according to the method described with respect to FIG. 2A.

The server (128) may include multiple applications. For example, the image matching system (130) may include a model system (132). The model system (132) is one or more machine learning models.

A machine learning model is an algorithm that has been trained to find patterns in a training dataset. The machine learning model is used to approximate a target function and is responsible for mapping the inputs to the outputs from the available dataset. The algorithm used depend upon the type of task. Machine learning models may be trained to perform a variety of functions, including matching, classification, regression, clustering, dimensionality reduction, principle component analysis, etc. In the one or more embodiments, the model system (132) is trained to at least compare the selected base images (118) to the selected captured images (120) (the input) and determine the match values (122) (the output). However, the image matching system (130) may include multiple models, as described with respect to FIG. 1B. Training of the model system (132) is described with respect to the training application (136), below.

The image matching system (130) also includes a server application (134). The server application (134) is the application which, when executed by the server (128), carries out the process described with respect to FIG. 2A. An example of the server application (134) is described with respect to FIG. 1B.

The image matching system (130) also includes a training application (136). The training application (136), when executed by the remote computer (138), trains one or more of the machine learning models in the model system (132).

Training a machine learning model involves an iterative process. Initially a training data set is provided as input to a machine learning model to be trained. The training data set has known labels. The expected output (e.g., the "answer" that the machine learning model should predict) when the machine learning model is executed on the training data is already known. A portion of the training data is held back for a later testing phase.

Initially, the selected portion of the training data is provided as input to the machine learning model. The machine learning model produces an output, such as for example a prediction of whether a selected base image matches a selected captured image. The output is compared to a known output. For example, the resulting output match value is compared to the expected result. In a more specific example, the machine learning model outputs a match value of 0.5, below a match threshold of 0.9; however, it is known that the selected base image should have matched the selected captured image. Thus, it is known that the machine learning model did not accurately predict that the selected base image matched the selected captured image.

As a result, the training application (136) generates a loss function. A loss function is a number or an algorithm that is used to adjust one or more weights of the machine learning model. Changing a weight changes how the machine learning model performs the machine learning algorithm. Thus, changing the weight changes the machine learning model.

The changed machine learning model is then re-executed on the training data. A new predicted match value is generated and compared again to the known value. If a match does not occur, a new loss function is generated, and the process is repeated.

The process continues to repeat until convergence. Convergence occurs when the output of the machine learning model, when fed the training data as input, is within a predetermined threshold of match of the known result. Alternatively, convergence occurs after a certain number of iterations have been performed.

Once convergence occurs, the machine learning model is deemed "trained." To ensure that the trained machine learning model is accurate to within a desired degree, the trained machine learning model may be "tested" on the portion of the training data that had been held back during the training phase. If the output of the machine learning model during testing matches the known output to within the threshold degree, the machine learning model is deemed ready for "production" or execution on unknown data at "runtime".

The system shown in FIG. 1 may optionally include a remote computer (138). The remote computer (138) is a computer that is external to and remote from the server (128), but in communication with the server (128). However, the remote computer (138) may also be a computer belonging to a third party outside of the system shown in FIG. 1. In an example, the remote computer (138) is a computer being used by a user for whom facial recognition verification is desired, such as presented in the examples of FIG. 3 through FIG. 6.

The remote computer (138) includes a camera (140). The camera (140) takes the captured image (104) and transmits the captured image (104) to the server (128).

Figure 1B:
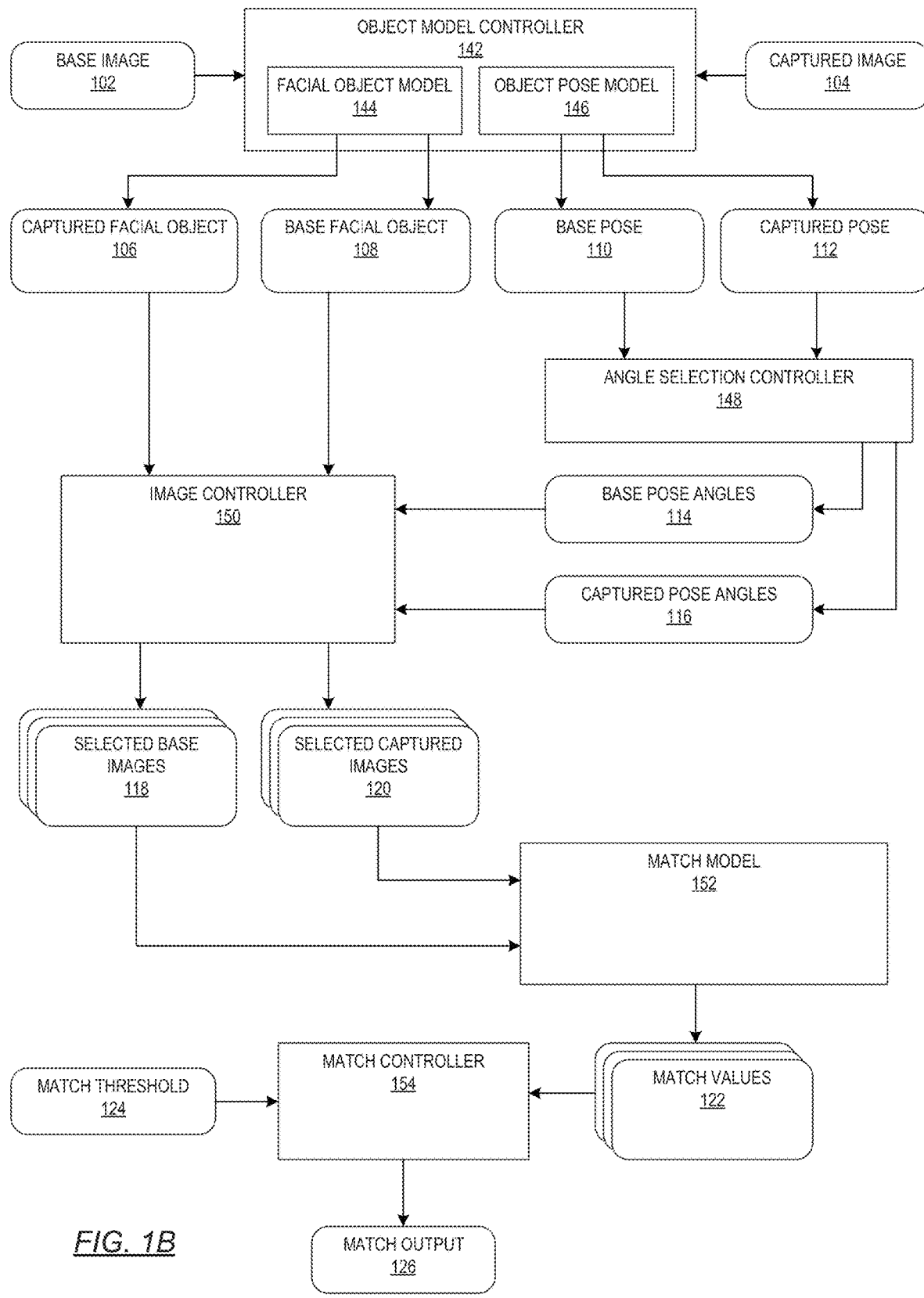

Attention is now turned to FIG. 1B. FIG. 1B is an example of the server application (134) described with respect to FIG. 1A, above. Reference numerals common to FIG. 1A and FIG. 1B refer to the same objects and have the same definitions.

The server application (134) includes an object model controller (142). The object model controller (142) is software and/or hardware that, when executed by the server (128), executes one or more machine learning models. The object model controller (142) takes as input the base image (102) and the captured image (104). The outputs of the object model controller (142) are described below.

The object model controller (142) includes both a facial object model (144) and an object pose model (146). The facial object model (144) is a machine learning model that takes as input either the base image (102) or the captured image (104). The facial object model (144) may be a variety of different image generation machine learning models that convert a two-dimensional image to a three-dimensional digital model. The facial object model (144) is trained on past base images and past captured images such that, when executed, the facial object model (144) outputs a facial object, such as the captured facial object (106) or the base facial object (108).

The object pose model (146) is a machine learning model that takes as input either the base image (102) or the captured image (104). The object pose model (146) may be a variety of different image classification machine learning models that estimate, for a two-dimensional image, a pose of the two-dimensional image. The object pose model (146) is trained on past base images and past captured images such that, when executed, the object pose model (146) outputs an estimated pose, such as the base pose (110) or the captured pose (112).

The server application (134) also includes an angle selection controller (148). The angle selection controller (148) is software and/or hardware that, when executed by the server (128), generates multiple pose angle variations according to a pre-determined set of rules. The number of pose angle variations generated depends on the type of pose (i.e., the base pose (110) or the captured pose (112)) and the estimated value of pose (i.e., the estimated values of the base pose (110) or the captured pose (112)). In any case, the angle selection controller (148) uses the selected pose angle variations to generate multiple pose angles for each of the base pose (110) and the captured pose (112). Thus, the output of the angle selection controller (148) is the base pose angles (114) and the captured pose angles (116).

The number and amount of pose angle variations may depend on the estimated value of the captured pose (112), as well as on the type of image. Because captured images are often subject to greater degradation when rotated, in one embodiment a rule is established to generate fewer of the base pose angles (114) at smaller pose angle intervals, relative to the captured pose angles (116). Description of how the angle selection controller (148) generates the base pose angles (114) and/or the captured pose angles (116) is described with respect to FIG. 2A.

The server application (134) also includes an image controller (150). The image controller (150) is software and/or hardware that is configured to digitally rotate the captured facial object (106) by each of the captured pose angles (116). The image controller (150) is also configured to digitally rotate the base facial object (108) by each of the base pose angles (114). Thus, the output of the image controller (150) is the selected base images (118) and the selected captured images (120). Operation of the image controller (150) is described further with respect to FIG. 2A.

The server application (134) also includes a match model (152). The match model (152) is a machine learning model that takes, as input, the selected base images (118) to the selected captured images (120). The match model (152) is trained to generate a probability of match between a first image (e.g., one of the selected base images (118)) to a second image (e.g., one of the selected captured images (120)). Thus, the match model (152) may be any one of a number of different digital image matching machine learning models. The output of the match model (152) are the match values (122). The operation of the match model (152) is described further with respect to FIG. 2A.

The server application (134) also includes a match controller (154). The match controller (154) is software and/or hardware that is configured to take, as input the match values (122), and to produce, as output, the match output (126). The match controller (154) may perform a variety of different functions, as explained with respect to FIG. 2A.

For example, the match controller (154) may be programmed such that, when executed by the server (128), the match controller (154) compares the match values (122) to a match threshold (124). If, in this example, any of the match values (122) satisfy the match threshold (124), then the match output (126) may be a report that the base image (102) matches the captured image (104). Again, the operation of the match controller (154) is described further with respect to FIG. 2A.

While FIG. 1A and FIG. 1B show a configuration of components, other configurations may be used without departing from the scope of the one or more embodiments. For example, various components may be combined to create a single component. As another example, the functionality performed by a single component may be performed by two or more components.

Figure 2B:
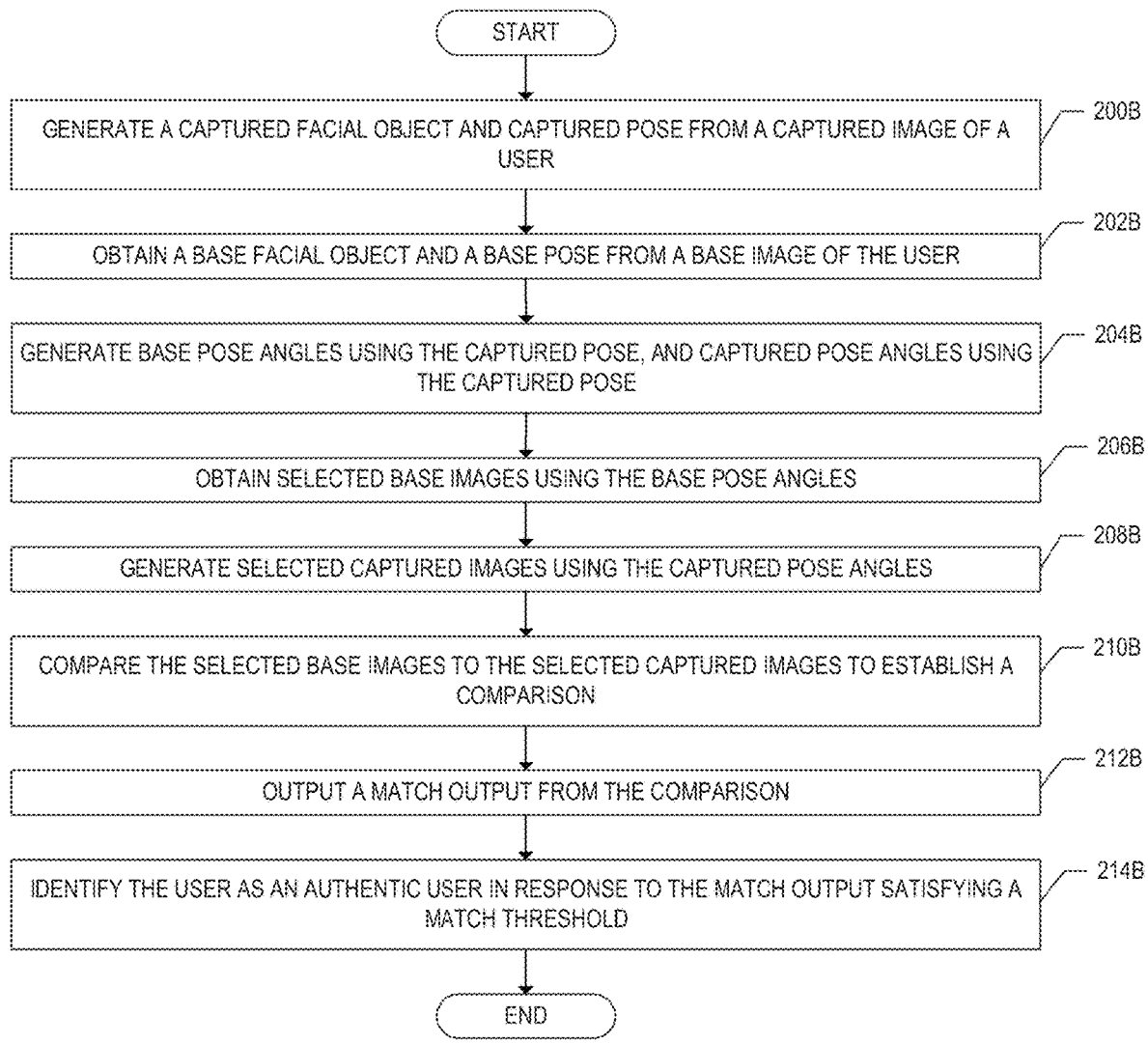
Figure 3:
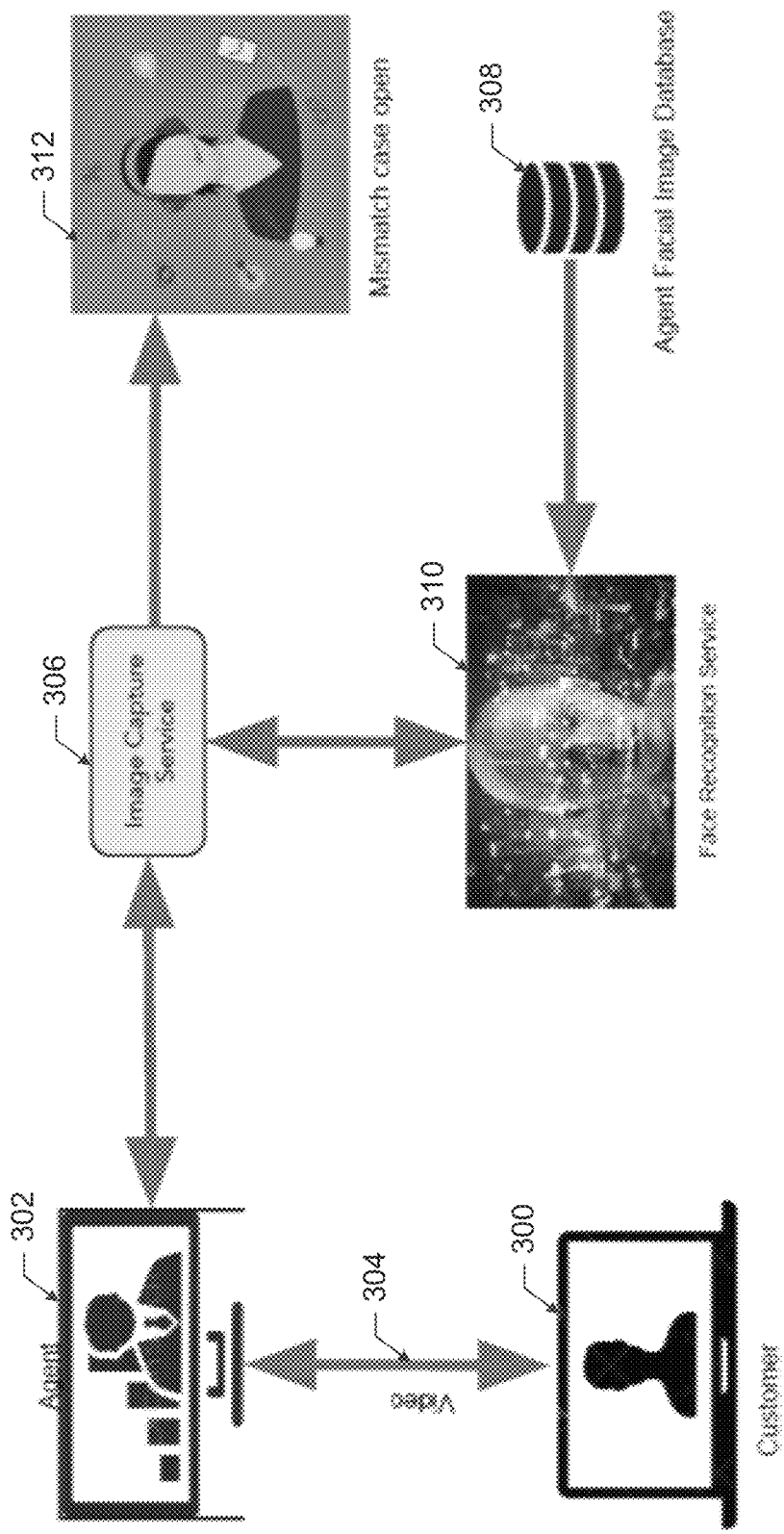
FIG. 3, FIG. 4, FIG. 5, and FIG. 6 show examples, in accordance with one or more embodiments.

FIG. 2A and FIG. 2B are flowcharts, in accordance with one or more embodiments. The methods of FIG. 2A and FIG. 2B may be implemented using the system shown in FIG. 1A using the server application (134) shown in FIG. 1B. The methods of FIG. 2A and FIG. 2B may be executed using a server or other processor, such as the server (128) of FIG. 1A or the computer processor(s) (702) of FIG. 7A. In the description of how the step in FIG. 2A may be accomplished, for additional clarity reference is made to terms as defined in FIG. 1B.

Step 200A includes generating a captured facial object and a captured pose from a captured image. The captured facial object is generated by transforming the captured image into a three-dimensional facial object. Transformation of the captured image into the captured facial object may be performed by using an image processing machine learning model, such as the facial object model (144) in FIG. 1. The input to the model is the captured image, and the output of the model is the captured facial object. A further example is shown in FIG. 3 through FIG. 6.

Step 202A includes obtaining a base facial object and a base pose from a base image. Similar to step 200A, the base facial object is generated by transforming the base image into a three-dimensional facial object. Transformation of the base image into the base facial object may be performed by using an image processing machine learning model, such as the facial object model (144) in FIG. 1. The input to the model is the base image, and the output of the model is the base facial object. A further example is shown in FIG. 3 through FIG. 6.

In an embodiment, to improve efficiency of execution, the base facial object may have already been generated and stored prior to execution of the method of FIG. 2A at runtime (i.e., "runtime" means concurrently with capture of the captured image and generation of the captured facial object). Thus, to "obtain" a base facial object may mean to retrieve the base facial object from storage, or may mean to generate the base facial object at runtime.

In an embodiment, step 200A and step 202A may be performed concurrently (e.g., in parallel or closely in time). In another embodiment, step 200A and step 202A may be performed serially, and possibly in an order opposite to that shown in FIG. 2A.

Step 204A includes generating base pose angles using the base pose, and captured pose angles using the captured pose. The base pose angles and the captured pose angles may be generated using the angle selection controller (148) described with respect to FIG. 1. Step 204A may be performed concurrently with step 200A or step 202A, or serially as indicated in FIG. 2A.

The number of pose angle variations for the base pose angles (114) may be determined by using a pre-selected number of desired variations for the base facial object (108). The pre-selected number may be as few as two, but may be as high as six or more. The number of pose angle variations for the base pose angles (114) may depend on the estimated value of the captured pose (112). For example, the greater the estimated value of the captured pose (112), the greater the number of desired variations of the base pose angles (114) in order to maximize the probability that a correct positive match may be found, if a match is available.

The number of pose angle variations for the captured pose angles (116) may be determined by using a pre-selected number of desired angle variations for the captured facial object (106). As indicated above, the captured image (104) (as well as the base facial object (108)) may be subjected to unacceptable degradation when rotated by more than a certain amount. Thus, the number of pose variations for the captured pose angles (116) may be kept smaller than the number of pose variations of the base pose angles (114). In an embodiment, the number of the captured pose angles (116) may be a pre-selected number (e.g., three), or may be based on the estimated value of the captured pose (112).

The value of the pose angle variations (i.e., the exact number of the base pose angles (114) and the exact number of the captured pose angles (116)) may be selected based on the estimated value of the captured pose (112), as determined by the object pose model (146). The values of the pose angle variations for either the base pose angles (114) or the captured pose angles (116) may be pre-determined numbers.

For example, if the value of the captured pose (112) is in the range of 30 to 36, then there may be six of the base pose angles (114). However, if the value of the captured pose (112) is in the range of 37-45 then there may be eight of the base pose angles (114). In either case, the number of the captured pose angles (116) is fixed at three in this particular example. These examples may be varied.

In a specific, non-limiting example, assume that the base image (102) has a base pose (110) of "0, 0, 0" degrees (a "small" pose). Further assume that the captured image (104) has a captured pose (112) of "36, 0, 0" degrees in terms of "yaw, pitch, and roll". A captured pose of (36, 0, 0) is considered a "large" pose. In this example, the captured facial object (106) (that is generated from the captured image (104)) cannot be rotated by more than five degrees without unacceptable digital degradation of the captured facial object (106) generated from the captured image (104).

The angle selection controller (148) then generates, or retrieves from memory, a selected number of the base pose angles (114). The number of base pose angles (114) is selected to be 7, because the captured pose (112) is in the range of pose angles between 30 and 36 degrees in at least one orientation. The differences between the base pose angles (114) is selected to vary by dividing the captured pose (112) by the number 6 (one less than the 7 desired). Thus, each of the base pose angles (114) will be different from each other by 36 divided by 6, or six degrees in the pose direction (i.e., (6, 0, 0)). The starting rotation of the middle of the base pose angles (114) is selected to be the same as the captured pose (112) (i.e., 36 degrees). The other six of the base pose angles (114) are spaced plus or minus six degrees from the value of the captured pose (112). Thus, the base pose angles (114) are selected to be (18, 0, 0), (24, 0, 0), (30, 0, 0), (36, 0, 0), (42, 0, 0), (48, 0, 0), and (54, 0, 0). Alternatively, the separations may only proceed in one direction (e.g., starting at (36, 0, 0) the base pose angles are (36, 0, 0), (30, 0, 0), (24, 0, 0), (18, 0, 0), (12, 0, 0), (6, 0, 0), and (0, 0, 0)).

The angle selection controller (148) then generates a number of the captured pose angles (116). With a relatively large captured pose (112) value of (36, 0, 0), digital image degradation of the captured facial object (106) will occur, in this example, if one of the captured pose angles (116) varies by more than plus or minus five degrees. Thus, in this example, there are three captured pose angles (116) centered on the base pose angles (114) value, each spaced by five degrees. Accordingly, in this example, the captured pose angles (116) are (31, 0, 0), (36, 0, 0), and (41, 0, 0).

Step 206A includes obtaining selected base images using the base pose angles. Obtaining the selected base images is performed by using an image controller (such as image controller (150) in FIG. 1) to rotate the base facial object (108) by each of the base pose angles (114). Thus, the number of selected base images (118) will equal the number of base pose angles (114) used. Continuing the above example, seven selected base images (118) would be generated; namely, the base facial object (108) as rotated by each of (18, 0, 0), (24, 0, 0), (30, 0, 0), (36, 0, 0), (42, 0, 0), (48, 0, 0), and (54, 0, 0) degrees.

Stated differently, step 204A and step 206A may be described as follows. The base pose is divided by a selected number to generate angular separation values. For ones of the angular separation values, the base facial object is rotated by one of the angular separation values. The selected base images include the base facial object as rotated by ones of the angular separation values.

Step 208A includes generating selected captured images using the captured pose angles. Obtaining the selected captured images is performed by using an image controller (such as image controller (150) in FIG. 1) to rotate the captured facial object (106) by each of the captured pose angles (116). Continuing the above example, three selected captured images (120) would be generated; namely, the captured facial object (106) as rotated by each of (31, 0, 0), (36, 0, 0), and (41, 0, 0).

Stated differently, step 204A and step 206A may be described as follows. Angular separation values that are less than a maximum value are selected. For ones of the angular separation values, the captured facial object are rotated by one of the angular separation values. The selected captured images include the captured facial object as rotated by ones of the angular separation values.

Step 210A includes comparing the selected base images to the selected captured images to establish a comparison. The comparison may be performed by comparing one or more of the selected base images (118) to one or more of the selected captured images (120). Each comparison is performed using a match model (152), as described with respect to FIG. 1. The match model (152) takes as input any two images, one from the selected base images (118) and one from the selected captured images (120). The match model (152) generates as output a match value that represents the probability that the selected one of the selected base images (118) matches the selected one of the selected captured images (120).

In an embodiment, every one of the selected base images (118) is compared to every one of the selected captured images (120). Thus, continuing the above example, the match model (152) may perform a total of twenty-one comparisons (i.e., all seven of the selected base images (118) are each compared to all three of the selected captured images (120)). As a result, twenty-one match values (122) will be generated, with each match value representing a degree or probability of match between any selected one of the selected base images (118) and a selected one the selected captured images (120).

Step 212A includes outputting a match output using the comparison. The match output is generated by the match controller (154). The match controller (154) takes as input the match values (122) and produces as output the match output (126).

In an example, the match controller (154) may compare each of the match values (122) to a match threshold (124). If any one of the match values (122) satisfies the match threshold (124), then the match controller (154) generates a match output (126) that indicates that a match exists between the base image (102) and the captured image (104).

Continuing the above example, assume that the match threshold (124) is 90% If any one of the match values (122) satisfies a value of 0.90, then the match output (126) is an indication that the base image (102) matches the captured image (104). So, for example, a photo identification image (base image (102)) of an employee would match the captured image (104) of the employee.

Step 212A may take other forms. For example, the match output (126) may be an indication that no match is found between the base image (102) and the captured image (104). In still another example, the match output (126) may be an action itself, rather than a separate action as described in step 214A, below. In yet another example, the match output (126) may be human-readable text or images displayed on a display device that indicate whether or not a match exists between the base image (102) and the captured image (104). In still yet another example, the match output (126) may be a report that includes one or more of: A) the match output (126) may be the match values (122) themselves, B) a report of which of the selected base images (118) were compared to the selected captured images (120), and/or C) an indication of a combined probability that the base image (102) matches the captured image (104). Many other variations are possible for the match output (126).

Step 214A includes processing an action using the match output. Step 214A may be optional in some embodiments. Step 214A may be performed by software and/or hardware to implement a desired action responsive to the match output (126) matching a pre-designated type of match output.

For example, if the match output (126) indicates no match between the base image (102) and the captured image (104), then the action may be to deny access to a user to certain software. An example of such an action is shown in FIG. 3 through FIG. 6. In another example, if the match output (126) indicates a match between the base image (102) and the captured image (104), then the action may be to allow access to a user to certain software. Again, an example is shown in FIG. 3 through FIG. 6. In yet another example, if the base image (102) matches the captured image (104), then the action may be to automatically grant a user access to a secure area, such as by unlocking a door, opening a safe, etc., (possibly in conjunction with additional security, such as some other biometric confirmation).

In still other examples, taking an action may include alerting, responsive to the match output failing to satisfy the match threshold, a third party user to a possible fraudulent use of the software application. Taking an action may include preventing, responsive to the match output failing to satisfy the match threshold, the remote user from using the software application. Taking an action may include reporting a highest percentage match between a single selected captured image from the selected captured images and a single selected base image from the selected base images. Thus, many different embodiments of step 214A exist.

The method of FIG. 2A may be further varied. More or fewer steps may be included, and/or the steps may be executed in a different order.

FIG. 2B is a variation of the method of FIG. 2A. The method of FIG. 2B may be considered a more specific example of the method of FIG. 2A.

Step 200B includes generating a captured facial object and captured pose from a captured image of a user. Step 200B is similar to step 200A from FIG. 2A.

Step 202B includes obtaining a base facial object and a base pose from a base image of the user. Step 20SB is similar to step 202B from FIG. 2A.

Step 204B includes generating base pose angles using the base pose, and captured pose angles using the captured pose. Step 204B is similar to step 204A from FIG. 2A.

Step 206B includes obtaining selected base images using the base pose angles. Step 206B is similar to step 206A from FIG. 2A.

Step 208B includes generating selected captured images using the captured pose angles. Step 208B is similar to step 208A from FIG. 2A.

Step 210B includes comparing the selected base images to the selected captured images to establish a comparison. Step 210B is similar to step 210A from FIG. 2A.

Step 212B includes outputting a match output from the comparison. Step 212B is similar to step 212A from FIG. 2A.

Step 214B includes identifying the user as an authentic user in response to the match output satisfying a match threshold. For example, if the match threshold is 95%, then a 95% match must exist among any two of the selected base images and the selected captured images for the user to be authenticated as an authentic user. When the user is an agent, the authentic user may be called an "authentic agent."

If the user is not authenticated as authentic, then the user may be asked to re-take the captured image. For example, the user may be prompted to look directly into the camera in order to obtain a different, smaller pose. The process is then re-executed.

If the user is not authenticated twice in a row, then the user may be locked out of software or out of an area. If the user is authenticated on either attempt, then the user may be granted access to the software or to the area. Authentication or non-authentication of the user may be reported to a third party in some examples.

Other consequences for one or more failures to generate a match are possible. For example, an alert may be raised so that a user or some other automatic process further investigates whether the user is authenticated. See, for example, the example of FIG. 6.

While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments. Thus, the one or more embodiments are not necessarily limited by the examples provided herein.

FIG. 3 through FIG. 6 present a specific example of the techniques described above with respect to FIG. 1A through FIG. 2B. The following example is for explanatory purposes only and not intended to limit the scope of the one or more embodiments.

In the example of FIG. 3 through FIG. 6, a company, ABC, offers customers access to expert professional advice from agents. ABC pays the agents to provide advice to the customers whenever the customers call with questions. The agents work remotely, possibly on home computers. The agents access software under the control of ABC in order to discuss issues with customers via a video conference.

In the example of FIG. 3 through FIG. 6, ABC has encountered a cyber security issue whereby malicious users break into ABC's software and pose as one of the agents. The malicious user may offer false advise to the customers or be rude to the customers in order to maliciously damage the reputation of ABC. To thwart this form of cyber-attack, ABC has implemented a video image matching system to ensure that the agents offering advice to the customers are the actual authorized agents. If an agent is not identified as being authorized, the agent's access to the software is blocked until the agent or ABC is able to clear the security problem. In this manner, the damage caused by the cyber-attacks may be minimized or thwarted.

Thus, for example, a customer (300) uses the software of ABC company to establish a video chat session (304) with an agent (302). At least the agent (302) has a video camera so that the customer (300) can see the face of the agent (302) during the video chat session (304).

ABC operates an image capture service (306) that captures a captured image of the face of the agent (302). ABC company also maintains a database (308) of base images that includes a base image of the agent (302). The base image of the agent (302) is a small pose picture taken of the agent (302), such as for an identification card.

ABC provides the captured image (from the image capture service (306)) and the base image (from the database (308)) to a facial recognition service (310). The facial recognition service (310) may be, for example, the system described with respect to FIG. 1A and FIG. 1B that operates according to the methods of FIG. 2A or FIG. 2B.

In this example, the facial recognition service (310) fails to generate a match between the captured image and the base image. As a result, a security system (312) is notified of the match failure. The security system (312) then opens a mis-match case, and verifies a prompt to cut off access by the agent (302) to the video chat software. As a result, the video chat session (304) is terminated and the agent (302) cannot engage with other customers until the mismatch case is resolved.

The customer (300) is notified that a technical problem has occurred and that the customer (300) will be re-routed to a different agent. After a brief pause, the customer (300) is put into contact, via ABC's software, with a different agent who provides the desired advice.

Later, or perhaps concurrently, the security system (312) contacts the agent (302) via some other communications channel (such as via email, private message, a telephone call, etc.). The agent (302) learns of the security breach and validates his or her credentials with the security system (312). The agent (302) changes his or her password to access the ABC software, and the security system (312) again allows the agent (302) to continue to receive new customer calls via the ABC software.

Figure 4:
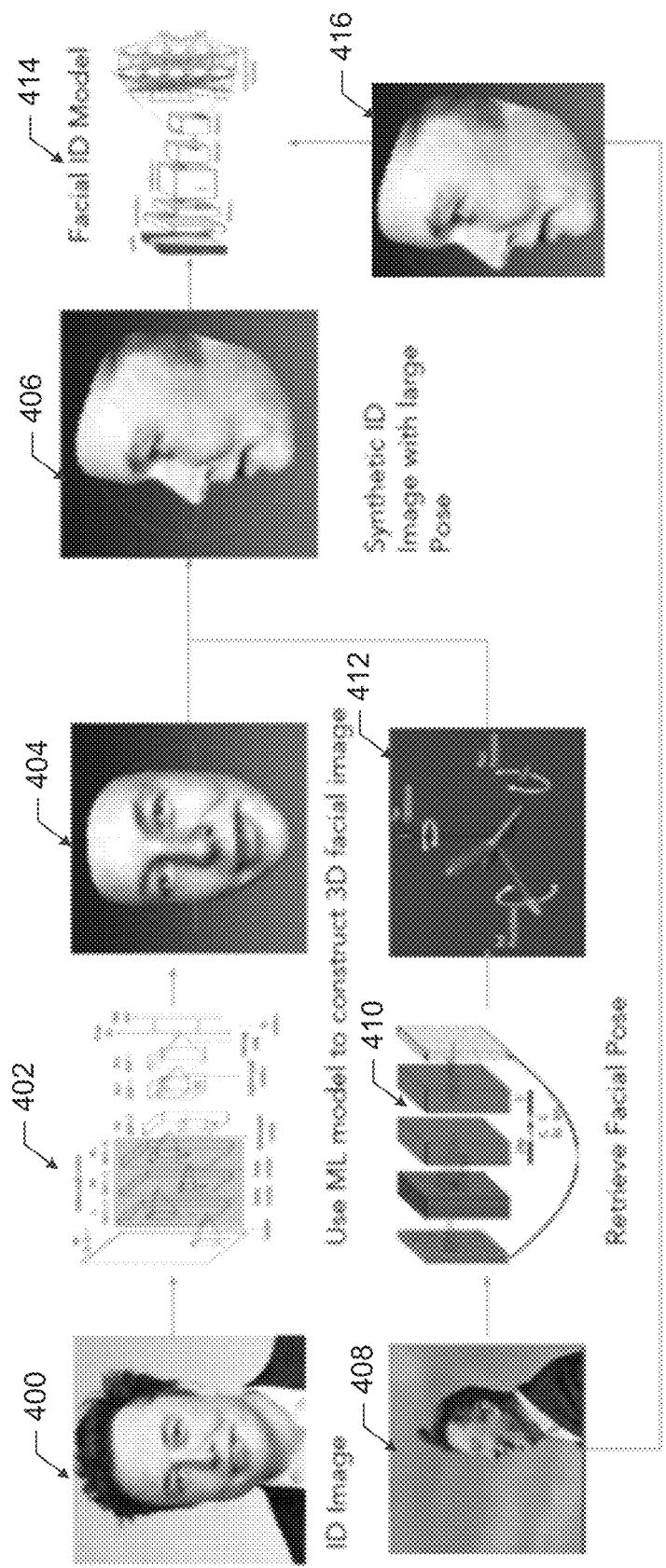

FIG. 4 shows an example of generating a base facial object and a captured facial object, as well as an example of rotating a facial object. Thus, FIG. 4 shows some of the details of the image capture service (306) and the facial recognition service (310) of FIG. 3.

Attention is first turned to generating the base facial object. An ID image (400) (i.e., identifier image) of a person is stored. The ID image (400) has a small pose.

The ID image (400) is fed to a facial object machine learning model (402) (e.g., facial object model (144) of FIG. 1). The output of the facial object machine learning model (402) is a base facial object (404) (e.g., the base facial object (108) from FIG. 1A and FIG. 1B). As can be seen, the base facial object (404) is a three-dimensional digital image that has been predicted or estimated from the two-dimensional ID image (400).

The base facial object (404) is then rotated using a base pose angle. The result of rotation is a selected base image (406) from among several other selected base images. Selection of the angle, as explained above, depends on a predicted pose angle of a captured image (408) of the person.

The captured image (408) has a large pose (i.e., shows a profile of the person, rather than the person looking directly into the camera). The exact pose angle is to be estimated. Thus, the captured image (408) is provided to an object pose machine learning model (410) (e.g., object pose model (146) of FIG. 1). The object pose machine learning model (410) estimates the pose of the captured image (408). In this example, the pose is estimated to be 90 degrees (i.e., a "perfect" profile image). Note that it is impractical to compare the ID image (400) directly to the captured image (408), as a machine learning model cannot match features between images that have been so radically rotated.

Next, pose angles (412) are estimated, as described with respect to step 204A of FIG. 2A. The pose angles (412) are the output of the object pose machine learning model (410). One of the pose angles is the same as the pose of the captured image (408) (i.e., an angle of (90, 0, 0) along pitch, yaw, and roll of the imaginary axis defined with respect to the captured image (408)).

Thus, the selected base image (406) shown in FIG. 4 is the base facial object (404) that has been rotated by an angle of (90, 0, 0). The selected base image (406) is then provided as part of the input to a facial identification machine learning model (414) (e.g., the match model (152) of FIG. 1B). The other image, to be compared to the selected base image, is a selected captured image (416). The selected captured image (416) is generated by rotating a captured facial object generated from the captured image (408), as explained with respect to step 208A of FIG. 2A.

As explained with respect to step 210A of FIG. 2A, the selected base image (406) is compared to the selected captured image (416) using the facial identification machine learning model (414). In this example, a match exists between the selected facial images.

Figure 6:
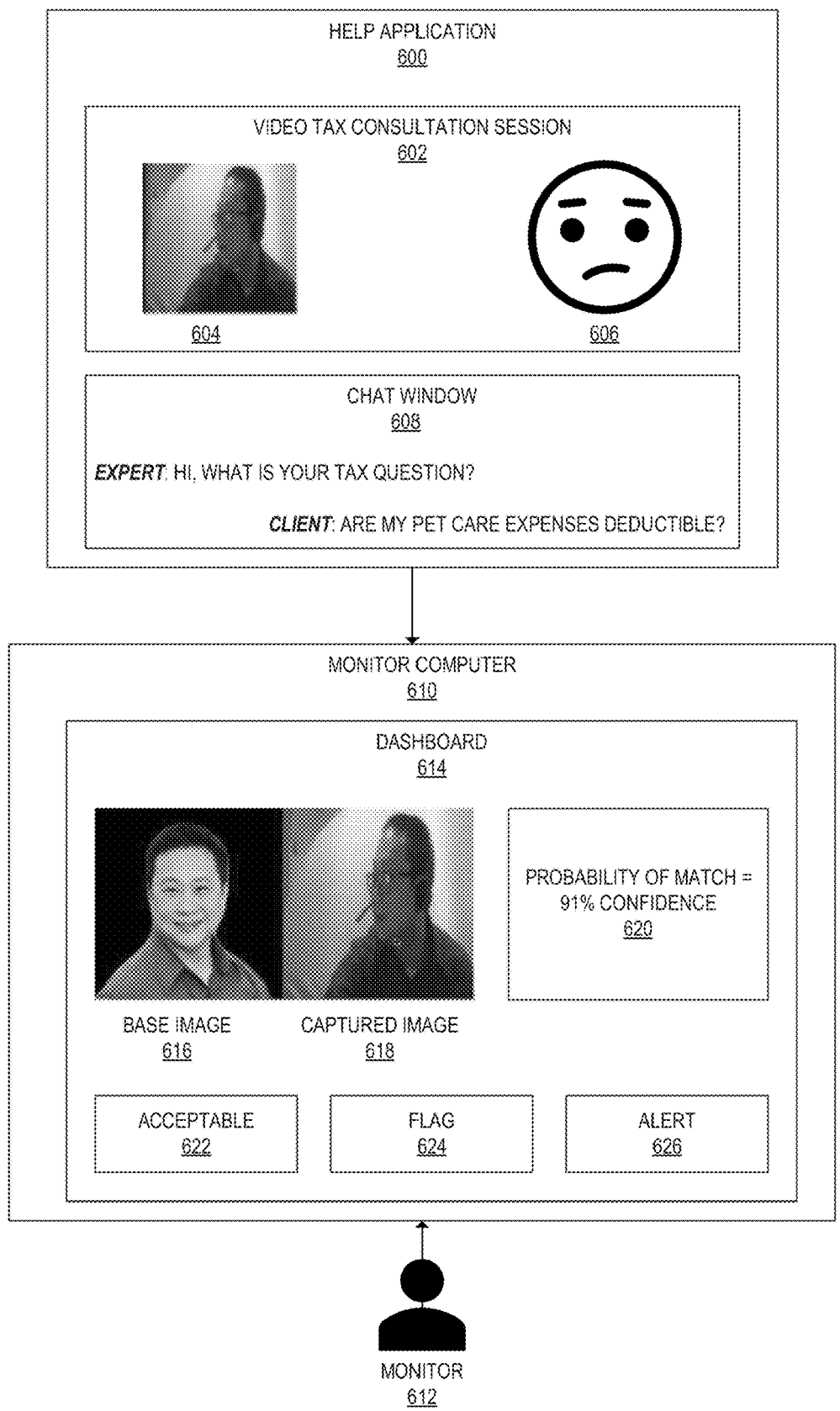

FIG. 6 shows another example of the system of FIG. 1A and FIG. 1B in use. In the example of FIG. 6, the base image (500) is taken from an identification card of an employee. The captured image (502) is taken at runtime, during a video chat between the employee and a customer (not shown).

As described with respect to FIG. 2A, step 200A, a captured facial object (504) is generated from the captured image (502). Multiple captured pose angles are generated (c.f., Step 204A of FIG. 2A). The captured facial object (504) is rotated by the multiple captured pose angles to generate nine selected captured images (506).

Similarly, a base facial object (not shown) is generated from the base image (500). Multiple base pose angles are generated (c.f., step 204A of FIG. 2A). The base facial object is rotated by the multiple base pose angles to generate nine selected base image (508).

Figure 5:
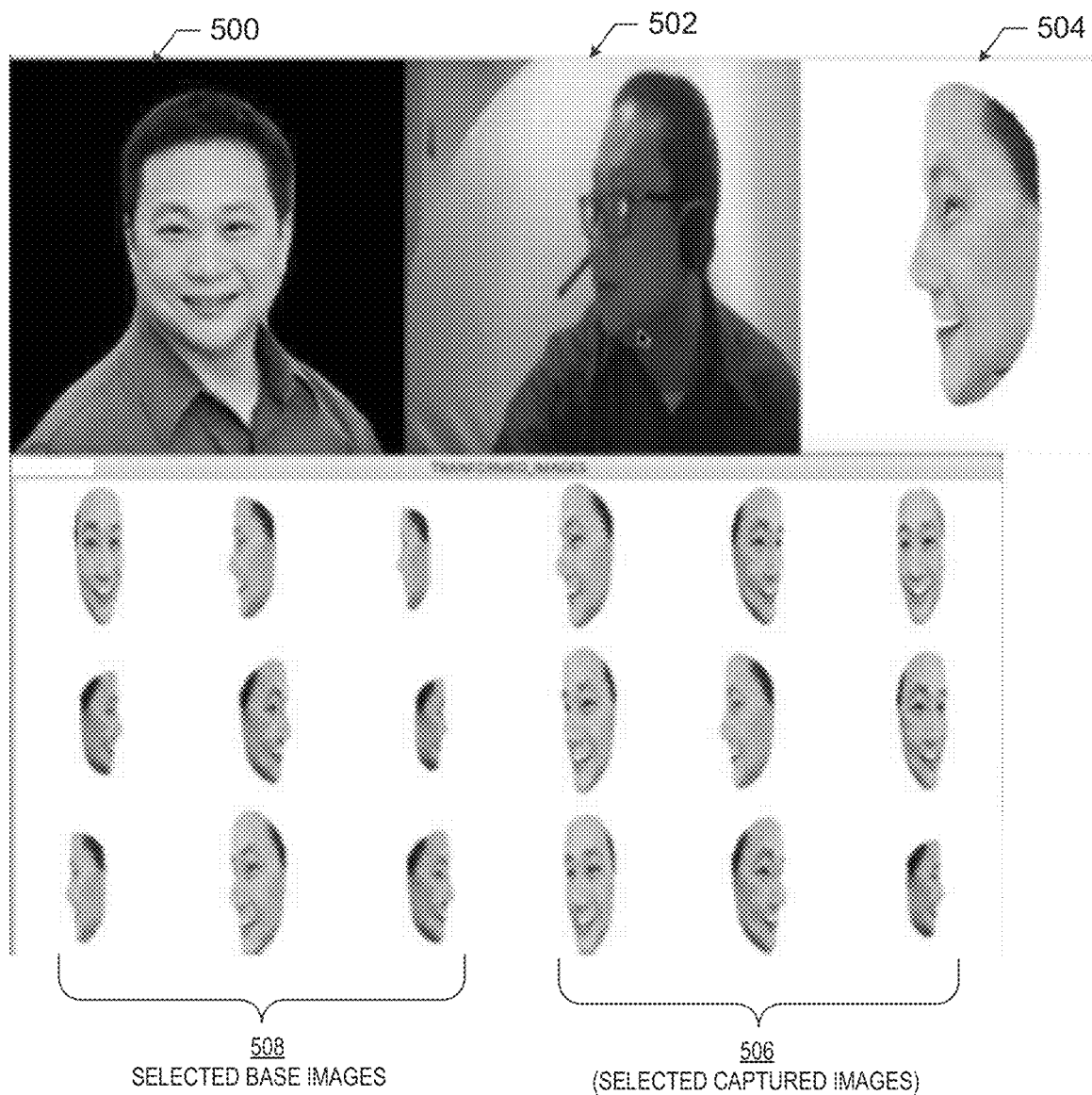

In the example of FIG. 5, all nine of the selected captured images (506) are compared to all nine of the selected base images (508). If a match exists between any two images, then the computer will return a match output that indicates that the captured image (502) matches the base image (500).

Attention is now turned to FIG. 6. FIG. 6 shows a variation of the cyber-security application described with respect to FIG. 3.

In the example of FIG. 6, ABC company operates a help application (600) for live video tax consultation services. Thus, a video tax consultation session (602) has been established between an agent (604) and a customer (606). The agent (604) is an employee of ABC company and is an expert in tax preparation services. The customer (606) has a tax preparation question. A chat window (608) records the substance of the conversation between the agent (604) and the customer (606). Only a portion of the conversation is shown in the chat window (608).

A remote monitor computer (610) is operated by a monitor (612). The monitor (612) is also an employee of ABC company. The monitor (612) monitors, without the knowledge of the customer (606), a dashboard (614) of a cyber-security program. The job of the monitor (612) is to verify that the agent (604) shown in the video tax consultation session (602) actually is the authorized agent. The cyber-security program is the system shown in FIG. 1A and FIG. 1B, which operates according to the method of FIG. 2A.

The dashboard (614) shows the results of the method of FIG. 2A, among other information. Thus, for example, the dashboard (614) shows the small-pose base image (616) taken from the ID card of the authorized agent. The dashboard (614) also shows the large-pose captured image (618) taken from the video tax consultation session 9602). The side-by-side presentation of the two images allows the monitor (612) to add a human assessment of the two images as a back-up to the computerized comparison. Thus, the monitor (612) in this example maintains control over whether some action is taken with respect to the current video tax consultation session (602). However, in other embodiments, automatic rules may control whether action is taken.

In some embodiments, a combination of system automation and monitor input may be used. For example, if the two dimensional captured image matches the two-dimensional base image, then the process terminates immediately, and the agent may continue using the help application (600). Similarly, if the probability of match (620) is above 95%, then the process terminates, and the agent may continue using the help application. If the probability of match is below 70%, then the process terminates and suspends the ability of the agent (604) to use the help application (600) until the security issue is resolved. The automatic suspension may take place before the customer is routed to the video tax consultation session (602) so that the customer experiences no interruption of service. However, as is the case here, when the probability of match is between 70% and 94%, then the monitor (612) is asked to perform an independent human verification.

The dashboard (614) thus shows a probability of match (620). The probability of match (620) is the match output of the system shown in FIG. 1B (cf., step 212A in FIG. 2A). In this example, the probability of match (620) is 91%, meaning that the system of FIG. 1A and FIG. 1B has determined that there is a 91% probability that the captured image (618) matches the base image (616). The monitor (612) can also make an independent judgement of whether the captured image (618) matches the base image (616).

The dashboard (614) also shows three widgets which the monitor (612) may manipulate to take some further action. A widget is a virtual button, scroll bar, tool, etc. displayed on a display device that a user may manipulate to cause the software being used to take some action. In this example, the three widgets are an acceptable widget (622), a flag widget (624) and an alert widget (626).

If the monitor (612) selects the acceptable widget (622), then the process terminates. The agent (604) is authenticated and may continue to use the help application (600).

If the monitor (612) selects the flag widget (624), then the process continues. Continued monitoring will take place. Possibly, the supervisor of the agent (604), who knows the agent (604) personally, may be notified and asked to make a second evaluation as to whether the agent (604) is verified. Alternatively, an alert may be issued so that further investigation of the agent (604) will be performed.

If the monitor (612) selects the alert widget (626), then the process terminates. However, the agent (604) may no longer use the help application (600). The video tax consultation session (602) is terminated. The customer (606) receives a pop-up window displaying a message that apologies for the interruption, that a technical problem has arisen, and that the customer will be routed to another agent to have the customer's question answered.

Alternatively, the monitor (612) may be permitted by ABC company to directly review and/or participate in the chat window (608), or to open a private message window to the customer (606). In either case, the monitor (612) may review the conversation in the chat window (608) and/or ask the customer (606) whether the customer (606) is satisfied with the service provided by the agent (604). In this manner, the monitor (612) may take care in determining whether it is appropriate to terminate the video tax consultation session (602).

Figure 7A:
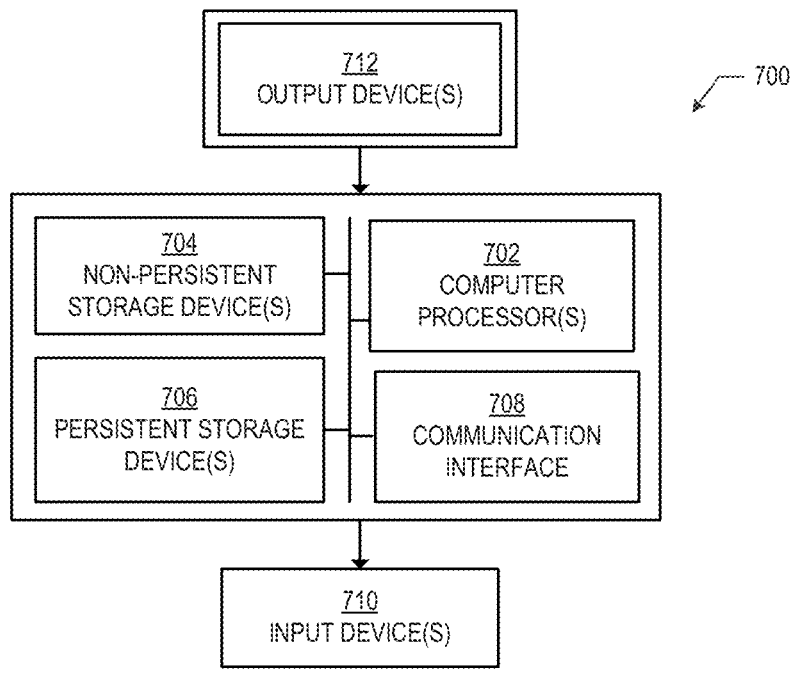
FIG. 7A and FIG. 7B show a computing system and a network environment, in accordance with one or more embodiments.
Figure 7B:
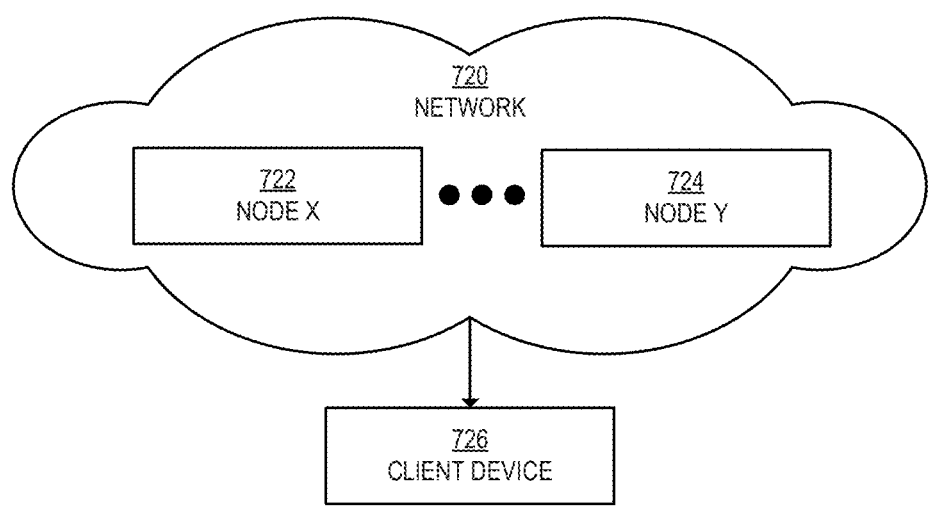

FIG. 7A and FIG. 7B are examples of a computing system and a network, in accordance with one or more embodiments. The one or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 7A, the computing system (700) may include one or more computer processor(s) (702), non-persistent storage device(s) (704) (e.g., volatile memory, such as random access memory (RAM), cache memory), persistent storage device(s) (706) (e.g., a hard disk, an optical drive such as a compact disk (CD) drive or digital versatile disk (DVD) drive, a flash memory, etc.), a communication interface (708) (e.g., Bluetooth interface, infrared interface, network interface, optical interface, etc.), and numerous other elements and functionalities that implement the features and elements of the disclosure.

The computer processor(s) (702) may be an integrated circuit for processing instructions. For example, the computer processor(s) (702) may be one or more cores or micro-cores of a processor. The computing system (700) may also include one or more input device(s) (710), such as a touchscreen, a keyboard, a mouse, a microphone, a touchpad, an electronic pen, or any other type of input device.

The communication interface (708) may include an integrated circuit for connecting the computing system (700) to a network (not shown) (e.g., a local area network (LAN), a wide area network (WAN) such as the Internet, a mobile network, or any other type of network) and/or to another device, such as another computing device.

Further, the computing system (700) may include one or more output device(s) (712), such as a screen (e.g., a liquid crystal display (LCD), a plasma display, a touchscreen, a cathode ray tube (CRT) monitor, a projector, or other display device), a printer, an external storage, or any other output device. One or more of the output device(s) (712) may be the same or different from the input device(s) (710). The input and output device(s) (710 and 712) may be locally or remotely connected to the computer processor(s) (702), the non-persistent storage device(s) (704), and the persistent storage device(s) (706). Many different types of computing systems exist, and the aforementioned input and output device(s) (710 and 712) may take other forms.

Software instructions in the form of computer readable program code to perform the one or more embodiments may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform the one or more embodiments.

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system (700) shown in FIG. 7A, or a group of nodes combined may correspond to the computing system (700) shown in FIG. 7A. By way of an example, the one or more embodiments may be implemented on a node of a distributed system that is connected to other nodes. By way of another example, the one or more embodiments may be implemented on a distributed computing system having multiple nodes, where each portion of the one or more embodiments may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system (700) shown in FIG. 7A. Further, the client device (726) may include and/or perform all or a portion of the one or more embodiments.

The computing system (700) or group of computing systems described in FIGS. 7A and 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the one or more embodiments. The processes may be part of the same or different application and may execute on the same or different computing system.

Rather than or in addition to sharing data between processes, the computing system performing the one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the one or more embodiments, may extract one or more data items from the obtained data. For example, the extraction may be performed as follows by the computing system (700) in FIG. 7A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The extracted data may be used for further processing by the computing system. For example, the computing system (700) of FIG. 7A, while performing the one or more embodiments, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (700) in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (700) of FIG. 7A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (700) of FIG. 7A and the nodes (e.g., node X (722), node Y (724)) and/or client device (726) in FIG. 7B. Other functions may be performed using one or more embodiments.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:

1. A method comprising:
generating a captured facial object and a captured pose from a captured image, wherein:
the captured facial object comprises a computer generated construct of the captured image, and
the captured pose comprises a first set of angles for the captured facial object;
obtaining a base facial object and a base pose from a base image, wherein:
the base facial object comprises a three-dimensional computer generated construct of the base image,
the base pose comprises a second set of angles for at least one of the base image and the base facial object,
the base facial object comprises a pre-existing image taken before the captured facial object was captured, and
the second set of angles is smaller than the first set of angles;
generating a plurality of base pose angles using the captured pose, and a plurality of captured pose angles using the captured pose, wherein:
the plurality of captured pose angles comprise first pre-determined angle variations of the first set of angles, and
the plurality of base pose angles comprise second pre-determined angle variations of the second set of angles;
obtaining a plurality of selected base images using the plurality of base pose angles and the base facial object, wherein each of the plurality of selected base images is a corresponding first representation of the base facial object, as modified by the second pre-determined angle variations of the second set of angles;
generating a plurality of selected captured images using the plurality of captured pose angles and the captured facial object, wherein each of the plurality of selected captured images is a corresponding second representation of the captured image, as modified by the first pre-determined angle variations of the first set of angles;
comparing the plurality of selected base images to the plurality of selected captured images to establish a comparison; and
outputting, responsive to the comparison identifying at least one of the plurality of selected captured images as matching or not matching at least one of the plurality of selected base images, a match output.

2. The method of claim 1, further comprising:
processing an action using the match output.

3. The method of claim 2, wherein the action is selected from the group consisting of:
permitting, responsive to the match output satisfying a match threshold, a remote user to continue to use a software application;
alerting, responsive to the match output failing to satisfy the match threshold, a third party user to a possible fraudulent use of the software application;
preventing, responsive to the match output failing to satisfy the match threshold, the remote user from using the software application; and
reporting a highest percentage match between a single selected captured image from the plurality of selected captured images and a single selected base image from the plurality of selected base images.

4. The method of claim 1, further comprising:
identifying, based on the match output satisfying a match threshold, an agent as an authentic agent.

5. The method of claim 1, wherein:
generating the captured facial object comprises applying the captured image to a facial object model and outputting, from the facial object model, the captured facial object; and
generating the captured pose comprises applying the captured image to an object pose model and outputting, from the object pose model, the captured pose.

6. The method of claim 1, wherein:
generating the base facial object comprises applying the base image to a facial object model and outputting, from the facial object model, the base facial object; and
generating the base pose comprises applying the base image to an object pose model and outputting, from the object pose model, the base pose.

7. The method of claim 1, wherein obtaining the plurality of selected base images using the plurality of base pose angles comprises:
dividing the base pose by a selected number to generate a plurality of angular separation values; and
rotating, for ones of the plurality of angular separation values, the base facial object by one of the plurality of angular separation values,
wherein the selected base images comprise the base facial object as rotated by ones of the plurality of angular separation values.

8. The method of claim 1, wherein generating the plurality of selected captured images using the plurality of captured pose angles comprises:
selecting a plurality of angular separation values that are less than a maximum value; and
rotating, for ones of the plurality of angular separation values, the captured facial object by one of the plurality of angular separation values,
wherein the selected captured images comprise the captured facial object as rotated by ones of the plurality of angular separation values.

9. The method of claim 1, wherein comparing the plurality of selected base images to the plurality of selected captured images to establish the comparison comprises:
inputting the plurality of selected base images and the plurality of selected captured images to a match model;
comparing all of the plurality of selected base images to all of the plurality of selected captured images;
identifying, by the match model, a first image from the plurality of selected base images and a second image from the plurality of selected captured images such that the first image and the second image match most closely relative to all other images in the plurality of selected base images and the plurality of selected captured images; and
the comparison comprises a match value between the first image and the second image.

10. The method of claim 9, wherein outputting the match output comprises:
displaying the match value on a display device of a third party user.

11. A system comprising:
a processor;
a data repository in communication with the processor and storing:
a base image and a captured image,
a captured facial object and a base facial object, wherein the captured facial object comprises a computer generated construct of the captured image, wherein the base facial object comprises a three-dimensional computer generated construct of the base image, and wherein the base facial object comprises a pre-existing image taken before the captured facial object was captured,
a base pose and a captured pose, wherein the captured pose comprises a first set of angles for the captured facial object and the base pose comprises a second set of angles for at least one of the base image and the base facial object, and wherein the second set of angles is smaller than the first set of angles,
a plurality of base pose angles and a plurality of captured pose angles, wherein the plurality of captured pose angles comprise first pre-determined angle variations of the first set of angles, and the plurality of base pose angles comprise second pre-determined angle variations of the second set of angles,
a plurality of selected base images and a plurality of selected captured images, wherein each of the plurality of selected base images is a corresponding first representation of the base facial object, as modified by the second pre-determined angle variations of the second set of angles, and wherein each of the plurality of selected captured images is a corresponding second representation of the captured image, as modified by the first pre-determined angle variations of the first set of angles,
a plurality of match values, a match threshold, and a match output;
a model system executable by the processor and comprising:
a facial object model,
an object pose model, and
a match model; and
a server application which, when executed by the processor, is configured to:
apply the base image to the facial object model to generate the base facial object,
apply the captured image to the facial object model to generate the captured facial object,
generate the plurality of base pose angles based on the captured pose and the plurality of captured pose angles based on the captured pose,
generate the plurality of selected base images using the base facial object and the plurality of base pose angles,
generate the plurality of selected captured images based on the captured facial object and the plurality of captured pose angles,
apply the plurality of selected base images and the plurality of selected captured images to the match model to generate the plurality of match values, and
generate, responsive to the match model identifying at least one of the plurality of selected captured images as matching or not matching at least one of the plurality of selected base images, a match output from a combination of the plurality of match values and the match threshold.

12. The system of claim 11, wherein the server application is further configured to:
process an action using the match output.

13. The system of claim 12, wherein the action is selected from the group consisting of:
permitting, responsive to the match output satisfying the match threshold, a remote user to continue to use a software application;
alerting, responsive to the match output failing to satisfy the match threshold, a third party user to a possible fraudulent use of the software application;
preventing, responsive to the match output failing to satisfy the match threshold, the remote user from using the software application; and
reporting a highest percentage match between a single selected captured image from the plurality of selected captured images and a single selected base image from the plurality of selected base images.

14. The system of claim 11, wherein the server application is further configured to:
identify, based on the match output satisfying the match threshold, an agent as an authentic agent.

15. The system of claim 11, wherein:
generating the captured facial object comprises applying the captured image to a facial object model and outputting, from the facial object model, the captured facial object; and
generating the captured pose comprises applying the captured image to an object pose model and outputting, from the object pose model, the captured pose.

16. The system of claim 11, wherein:
generating the base facial object comprises applying the base image to a facial object model and outputting, from the facial object model, the base facial object; and
generating the base pose comprises applying the base image to an object pose model and outputting, from the object pose model, the base pose.

17. The system of claim 11, wherein obtaining the plurality of selected base images using the plurality of base pose angles comprises:
dividing the base pose by a selected number to generate a plurality of angular separation values; and
rotating, for ones of the plurality of angular separation values, the base facial object by one of the plurality of angular separation values,
wherein the plurality of selected base images comprise the base facial object as rotated by ones of the plurality of angular separation values.

18. The system of claim 11, wherein generating the plurality of selected captured images using the plurality of captured pose angles comprises:
selecting a plurality of angular separation values that are less than a maximum value; and
rotating, for ones of the plurality of angular separation values, the captured facial object by one of the plurality of angular separation values,
wherein the selected captured images comprise the captured facial object as rotated by ones of the plurality of angular separation values.

19. The system of claim 11, wherein comparing the plurality of selected base images to the plurality of selected captured images to establish a comparison comprises:
inputting the plurality of selected base images and the plurality of selected captured images to the match model;
comparing all of the plurality of selected base images to all of the plurality of selected captured images;
identifying, by the match model, a first image from the plurality of selected base images and a second image from the plurality of selected captured images such that the first image and the second image match most closely relative to all other images in the plurality of selected base images and the plurality of selected captured images; and the comparison comprises a match value between the first image and the second image.

20. A method comprising:

generating a captured facial object and a captured pose from a captured image, wherein:
- the captured facial object comprises a computer generated construct of the captured image, and
- the captured pose comprises a first set of angles for the captured facial object;

obtaining a base facial object and a base pose from a base image, wherein:
- the base facial object comprises a three-dimensional computer generated construct of the base image,
- the base pose comprises a second set of angles for at least one of the base image and the base facial object,
- the base facial object comprises a pre-existing image of a user taken before the captured facial object was captured, and
- the second set of angles is smaller than the first set of angles;

generating a plurality of base pose angles using the captured pose, and a plurality of captured pose angles using the captured pose, wherein:
- the plurality of captured pose angles comprise first pre-determined angle variations of the first set of angles, and
- the plurality of base pose angles comprise second pre-determined angle variations of the second set of angles;

obtaining a plurality of selected base images using the plurality of base pose angles and the base facial object, wherein each of the plurality of selected base images is a corresponding first representation of the base facial object, as modified by the second pre-determined angle variations of the second set of angles;

generating a plurality of selected captured images using the plurality of captured pose angles and the captured facial object, wherein each of the plurality of selected captured images is a corresponding second representation of the captured image, as modified by the first pre-determined angle variations of the first set of angles;

comparing the plurality of selected base images to the plurality of selected captured images to establish a comparison; and outputting, responsive to the comparison identifying at least one of the plurality of selected captured images as matching or not matching at least one of the plurality of selected base images, a match output; and identifying the user as an authentic user in response to the match output satisfying a match threshold.

* * * * *